United States Patent
Cao

(10) Patent No.: US 7,248,262 B2
(45) Date of Patent: Jul. 24, 2007

(54) PROCESS AND DATA STRUCTURE FOR PROVIDING REQUIRED RESOLUTION OF DATA TRANSMITTED THROUGH A COMMUNICATIONS LINK OF GIVEN BANDWIDTH

(75) Inventor: Jiangen Cao, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 204 days.

(21) Appl. No.: 09/797,191

(22) Filed: Feb. 28, 2001

(65) Prior Publication Data

US 2002/0158874 A1    Oct. 31, 2002

(51) Int. Cl.
*G06T 15/00*    (2006.01)

(52) U.S. Cl. ..................... 345/428; 345/419

(58) Field of Classification Search ................ 345/419, 345/420, 428
See application file for complete search history.

(56) References Cited

U.S. PATENT DOCUMENTS

| 4,847,788 A | * | 7/1989 | Shimada .................... 345/634 |
| 4,998,212 A | * | 3/1991 | Dedieu et al. ............. 345/634 |
| 5,999,664 A | * | 12/1999 | Mahoney et al. .......... 382/305 |
| 6,128,021 A | * | 10/2000 | van der Meulen et al. . 345/428 |
| 6,536,043 B1 | * | 3/2003 | Guedalia .................... 725/90 |

* cited by examiner

*Primary Examiner*—Phu K. Nguyen
(74) *Attorney, Agent, or Firm*—Patent Law Group LLP; David C. Hsia

(57) ABSTRACT

A data structure, termed a pyramid, representing levels of data is disclosed. A method to produce the data structure is also disclosed. The pyramid data structure includes a series of levels, termed floors. In turn, the each floor is comprised of numerous cells. The data structure may be cached or can be stored in a file or database for run-time access by distributed applications.

3 Claims, 3 Drawing Sheets

PROCESS AND DATA STRUCTURE FOR PROVIDING REQUIRED RESOLUTION OF DATA TRANSMITTED THROUGH A COMMUNICATIONS LINK OF GIVEN BANDWIDTH

Unless otherwise noted, technical terms used in this application follow the definitions set forth in the *Computer Dictionary, Second Edition*, published by Microsoft Press (Redmond, Wash., 1994).

BACKGROUND OF THE INVENTION

1. Field of the Invention

The present invention relates to data structures and processes for selecting and displaying information over a network between clients and servers. More particularly, but without limitation, the present invention relates to transferring data, as requested by a client from a server, efficiently through a communications link of given bandwidth.

2. Description of Related Art

Computer databases and the communications links between them have been compared to oceans connected by straws. That is, while computers (including clients and servers) can exchange much data through networks, the system designer should be cognizant that such links may be quickly overwhelmed. One approach to improve data exchange has been to increase the bandwidth available between clients and servers. Solutions include high-speed copper and fiber landlines, satellite transmission, and increasingly faster data switches.

However, no matter how wide the transmission band, the amount of data available to move is generally more massive than the capacity to move it. Moreover, blindly providing enough bandwidth to handle peak traffic is expensive and inefficient—at off-peak times the capability would be underutilized. A better solution is to balance bandwidth and data "resolution." That is, a system can be designed to reasonably increase the available transmission bandwidth while intelligently selecting data of high interest and importance to send.

The prior art describes methods for transferring data of varying degrees of resolution through a network on an as requested or as required basis. For example, in Molloy, U.S. Pat. No. 6,078,349, a system is disclosed in which video data on a display screen is sent in high resolution only to the portion of the screen at which a viewer is looking. As the viewer scans another section of the screen, the system detects the eye movement and requests high-resolution video data for that section. Molloy, however, may be inefficient for packet switched networks such as the Internet; by the time a server receives new instructions and transmits data, the viewer may have lost interest and may have moved on to another section of the screen or a new screen entirely.

Therefore, there is a need for an alternate means for providing high-resolution images by an efficient use of the available bandwidth of a transmission medium.

SUMMARY OF THE INVENTION

This invention provides a data structure and process for selecting data of high interest and importance, from a source such as a server, to be transferred to a receiver such as a client. From an application standpoint, this invention is readily adapted to increasing the display resolution of a sensory image, such as a digital image, being sent from a server over a network of given bandwidth, such as the Internet, to a client.

However, the digital image applications, and descriptions herein, of this invention do not preclude other uses. The invention, for example, may be used to transmit text and/or data from a database to another. Or it may be part of a system to send information from one process within a computer to another process within the same computer. It will be readily apparent, to one skilled in the art, how this invention, when described in terms of transmitting digital images, may be adapted to other forms of data exchange.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

A data structure, termed a pyramid, representing levels of data is disclosed. A method to produce the data structure is also disclosed. The pyramid data structure includes a series of levels, termed floors. In turn, the each floor is comprised of numerous cells. The data structure may be cached or can be stored in a file or database for run-time access by distributed applications.

Figure 1:
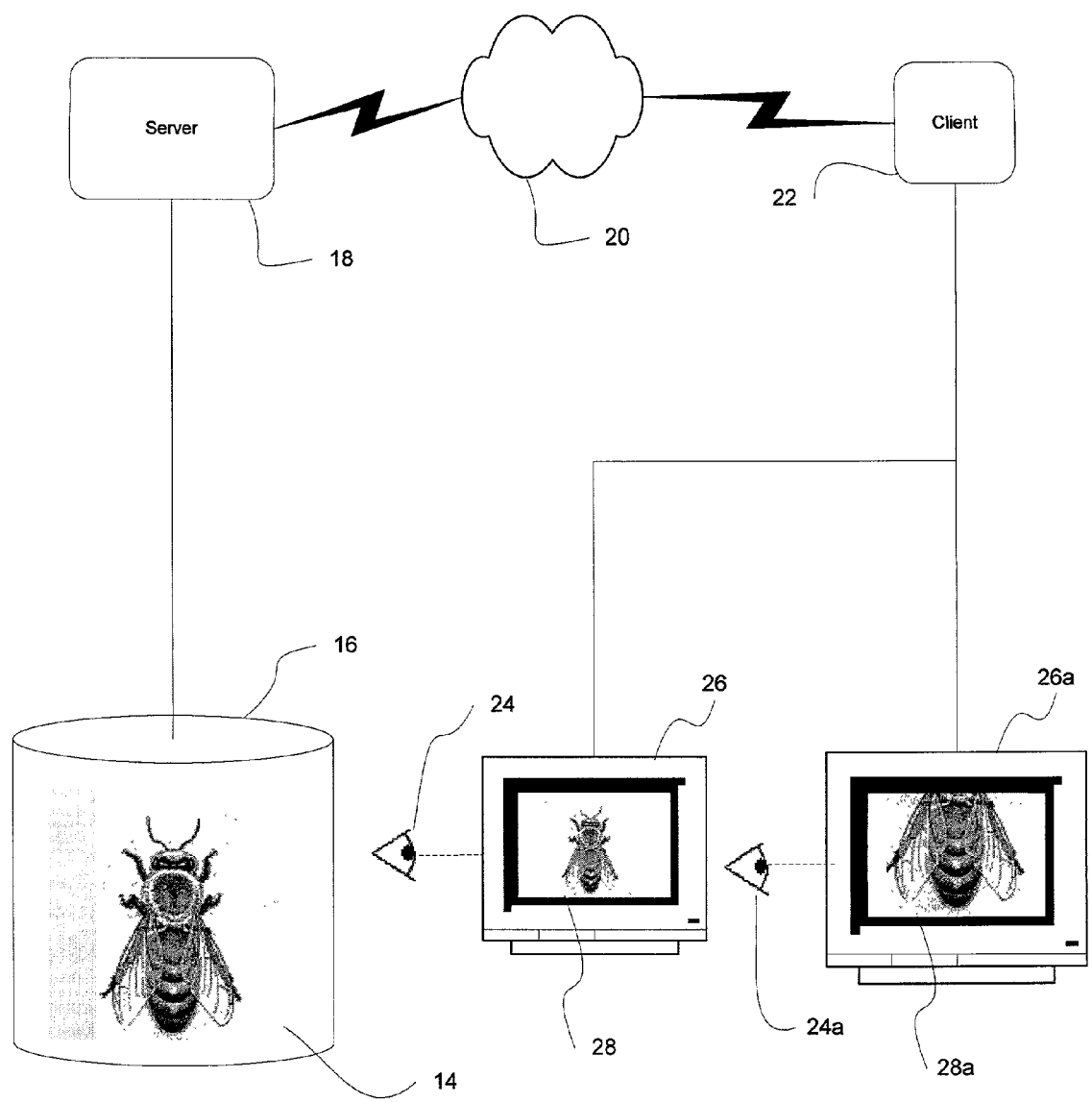
FIG. 1 is a block diagram of a system that may utilize the invention to transmit digital image data from a server to a client.

One application for the pyramid data structure is for transmitting digital image data. Referring to FIG. 1, a high-resolution picture 14 stored on disk 16 may contain multiple megabytes of data. Sending such a large amount of data from a server 18 across the Internet 20 to a client 22 may take a significant amount of time. The resolution of picture 14 may be reduced to 100 kilobytes, for example, which is much faster to download from server 18 to client 22.

A viewer 24 at a client monitor 26 may look at an entire picture 28 at the reduced resolution. Viewer 24a, on the other hand, may decide to view a portion of picture 14 at a higher resolution. When the server 18 receives an instruction, data from the relevant portion of picture 14 is sent to the client. This portion is displayed on monitor 26a as picture 28a. Viewer 24a may also pan from one portion of the picture 28a to another; the server 18 passes data to the client 22 corresponding to the pan requests.

Figure 2:
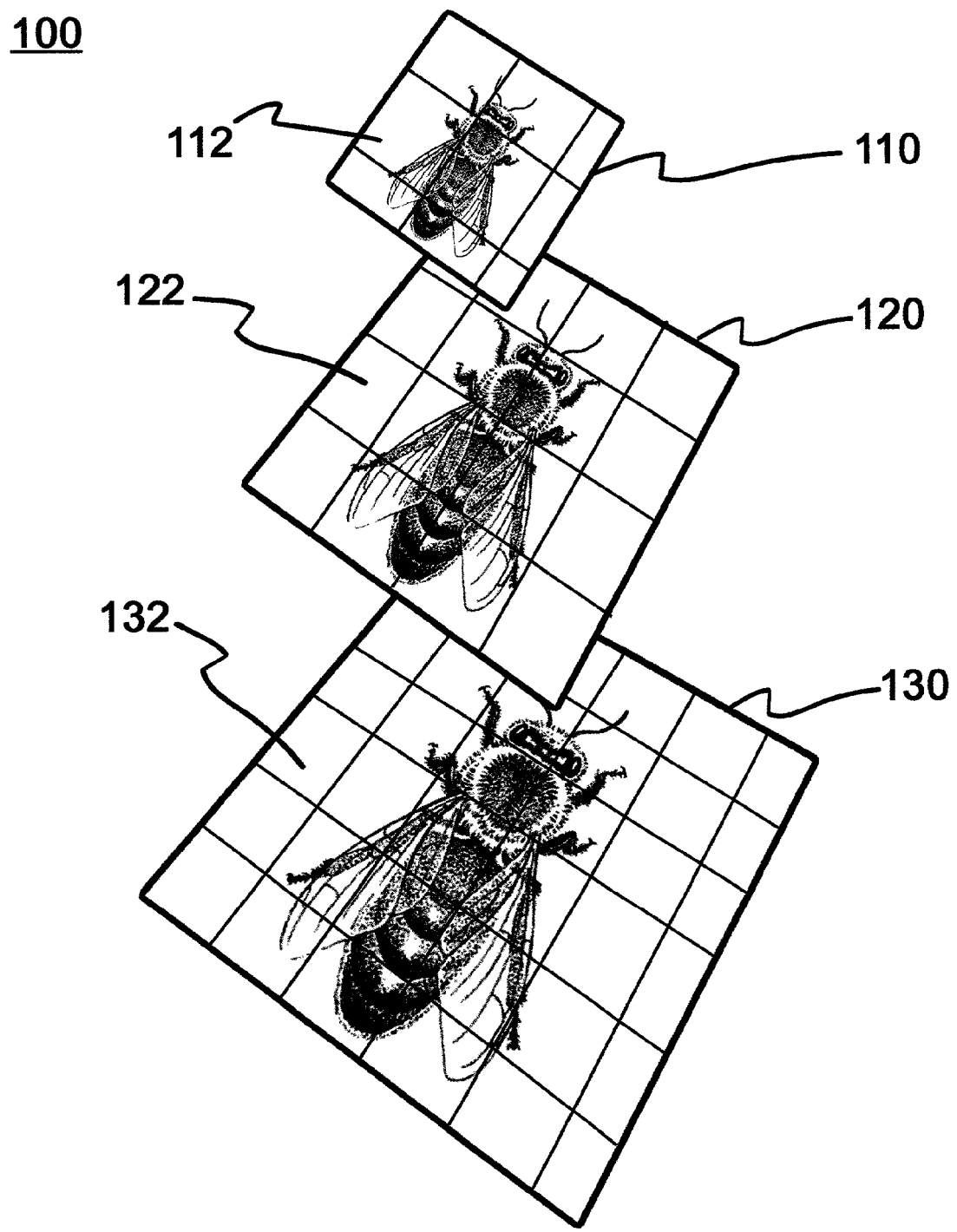
FIG. 2 is a block diagram showing the primary components of a pyramid data structure.

The pyramid data structure at the server 18 organizes digital images for efficient transfer to the client 22. Referring to FIG. 2, pyramid 100 comprises floors 110, 120, and 130. The actual number of floors in a given pyramid depends on the application and is not necessarily three. In turn, each floor includes a number of cells, such as 112, 122, and 132. While in this instance each floor contains fewer cells than the one beneath it, this is not necessarily so in all applications. In a digital image transfer application, the cells contain a set of pixels corresponding to a portion of an overall image. The data comprising the reduced resolution picture 28 is contained in the cells comprising top floor 110 of pyramid 100.

When, after viewing picture 28, viewer 24 wants to see a portion in higher resolution, the client sends an instruction to server 18, which in turn accesses cell data in floor 120. This process may be repeated. If the viewer wishes to zoom further, the server 18 accesses floor 130, etc. Once at the appropriate floor, panning requests result in further data transfers from that floor. It should be noted that as data is received at the client 22 it could be cached and reaccessed locally. The overall goal is to accommodate viewer 24 requests for quality data at a rate that the Internet can reasonably provide.

FIG. 2 also shows how each floor relates to an image. Cells on floor 110 of pyramid 100 contain data representing the low-resolution image 28. Floor 120 data cells are more numerous because they represent medium resolution image 28a. And floor 130 contains yet more data cells because they represent a high-resolution image 28b.

A pyramid data structure includes attributes for cells, floors, and the pyramid itself. For cells, the attributes include an x offset from the data origin, a y offset (and if needed a z offset, etc.), a width of cell, a height of cell (and if needed a length of cell, etc.), and a path to the location of the cell file. For floors, the attributes include a width, height (and if needed a length, etc.) of the floor, a row, column (and if needed additional dimensions), a "folder" (or equivalent) holding the cells for the floor, and the "zoom" ratio for the floor. For the pyramid, attributes include a directory where the pyramid is stored, a width and height (and if needed length, etc.) of the image or dataset, cell width and height (and if needed length, etc.), and an array of the floors in the pyramid.

In outline form, the pyramid data structure is as follows:
Cell Attributes
{
x offset
y offset
width of cell
height (or length) of cell
path of cell file
}
Floor Attributes
{
width of floor
height (or length) of floor
count of row
count of column
"folder" directory holding all cells on this floor
zoom ratio of this floors
}
Pyramid Attributes
{
directory where pyramid is stored
width of image
height (or length) of image
cell width
cell height (or cell length)
array of floors in the pyramid
}

A specific representative pyramid data structure follows:

```
class Cell{
    int     m_x;            // left offset from image origin.
    int     m_y;            // top offset from image origin.
    int     m_w;            // width of cell, in pixel.
    int     m_l;            // length of cell, in pixel.
    Cstring m_fPathCell;    // full path of cell file
};
class Floor {
    int     m_nZoom;        // what zoom ratio it is at
    int     m_cx;           // width of floor
    int     m_cy;           // length of floor
    int     m_cCol, m_cRow; // number of column and row of cells
    Cstring m_sDir;         // top level directory for this
floor
    CobArray m_rgCell;      // array to hold cells in this floor
};
class CPyramid {
    Cstring m_rootDir;      // dir to store pyramid.
    int     m_cxImg;        // width of image, original size
    int     m_cyImg;        // length of image, original size
    int     m_cxCell;       // cell width
    int     m_cyCell;       // cell length
    CObArray m_rgFloor;     // array of floors in the pyramid.
private:
    . . .
};
```

It will be obvious to one skilled in the art that certain modifications may be made to the data structure without departing from the spirit of the invention. For example, variable labels may be changed and the order in which they are listed may be altered. The variables and arrays alternately may be referenced as pointers. And the two dimensional nature of the cells and floors may altered to provide as many dimensions as needed in a specific application.

It must be emphasized that this data structure is not merely for digital image data. For example, it could easily be adapted to text: one floor of a pyramid could be a summary article; another floor could be a scholarly interpretation; and yet another floor could correspond to primary source material.

Once the computer information has been described using the data structure, the data structure may be cached or transported to a file or database using any known methods.

To construct an image pyramid involves a large amount of computation. To keep the computation time manageable, this invention (1) uses a lookup table to reduce the multiplication involved with picture sampling for each floor, and (2) performs cropping and pixel sampling in one step to reduce memory usage for an intermediate object.

Generally speaking, picture sampling creates a new picture by selecting pixels from old pictures. For each pixel in new picture, its corresponding position in the old one is selected. For example, to create a floor the following mapping may be used:

$$F\text{-}1\text{:}\{p(x,y)=p0(z^*x,z^*y);\},$$

where the zoom ratio=z.

This means that the value of pixel p1 at (x,y) of new picture will be taken from the pixel p0 at (z*x,z*y) of the original picture. It has two multiplications per pixel. This means that the value of pixel p1 at (x,y) of new picture will be taken from the It will be O(n*n) times in total. The trick to reduce the computation is to create two look-up tables by F-2:

$$F\text{-}2\text{:}\{zx[x]=z^*x;zy[y]=z^*y;\}$$

Then:

$$F\text{-}1: \{p1(x,y)=p0(zx[x],zy[y]);\}$$

It is just O(n) times. By taking offset: {left, top} of cell at position: {column, row} into consideration, and introducing another two look-up tables by F-4:

$$F\text{-}3: \{left[column]=column*cell\ width;\ top[row]=row*image\ width;\}$$

F-1 changes to F-4:

$$F\text{-}4: \{p1(x,y,\ column,\ row)=p0(zx[x]+left[column],zy[y]+top[row]);\}$$

This is the final optimized cell sampling formula. It involves with only O(n) times of multiplication and O(n*n) times of addition if n is much greater than 1.

The pseudocode to generate a complete pyramid follows:
1 for each floor in the pyramid
2 for each cell on the floor
3 for each pixel of cell
4 p1 (x, y, column, row)←p0 (zx[x]+left[column], zy[y]+top [row])

Figure 3:
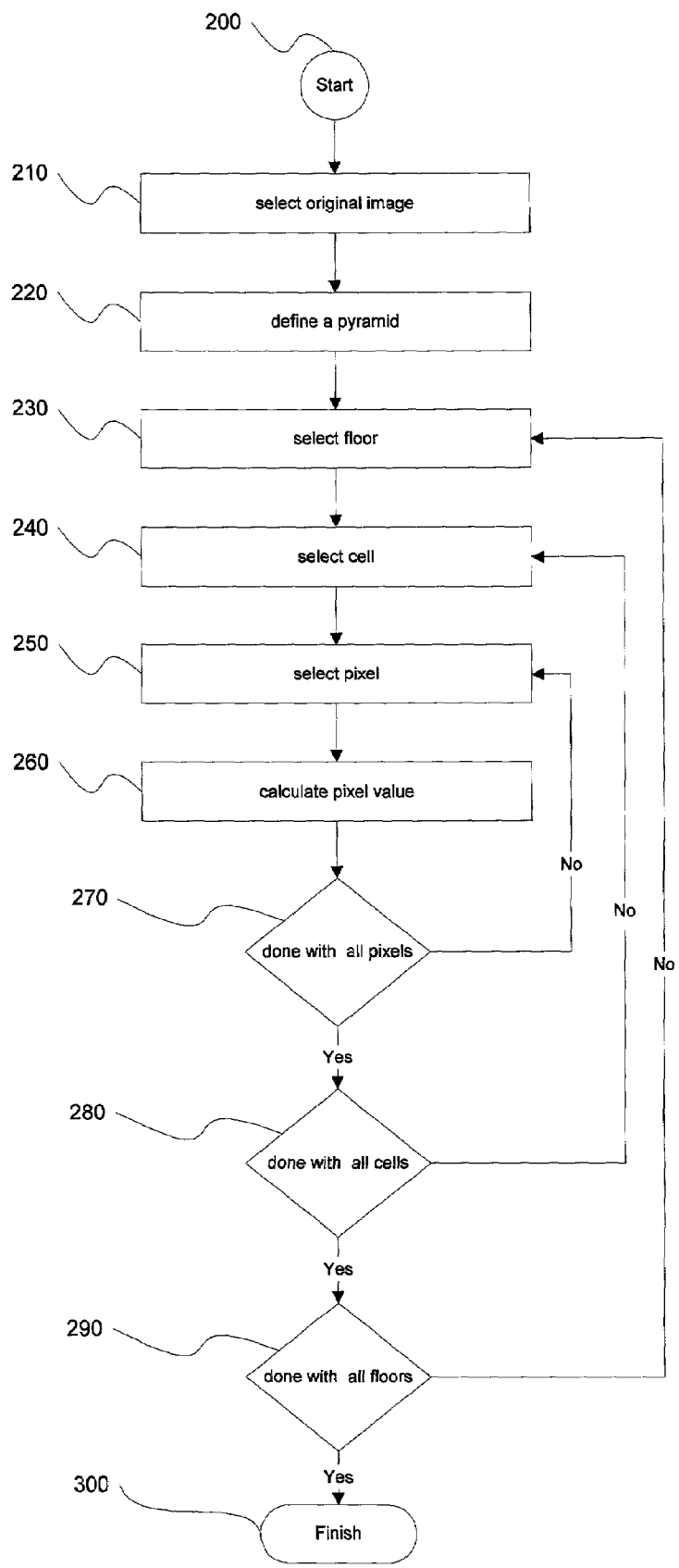
FIG. 3 is a flow chart of the steps performed by a data processor to construct a pyramid data structure.

Referring to FIG. 3, at the start 200 of the construction an image pyramid, a digital image is selected 210. Then a pyramid appropriate to the image is defined 220. Next, a floor is selected 230, a cell within a floor is selected 240, and a pixel within a cell is selected 250. The pixel value is calculated 260 in accordance with the step defined in line 4 of the pseudocode given in the above paragraph. Pixel are continuously selected 270 until all pixels in all cells on all floors are calculated 280, 290, 300.

Having thus described a preferred embodiment of the pyramid data structure representing digital image data files, and a preferred method for generating a pyramid, it should be apparent to those skilled in the art that certain advantages of the within system have been achieved. It should also be appreciated that various modifications, adaptations, and alternative embodiments thereof may be made within the scope and spirit of the present invention.

The invention is further defined by the following claims.

What is claimed is:

1. A method for displaying an image, wherein the image is stored in different resolutions in its entirety and the image at each resolution is divided into cells, the method comprising:

a client computer receiving a first set of cells making up at least part of the image at a first resolution from a server computer;

the client computer directly displaying the first set of cells to a user;

the client computer sending a first instruction to zoom into the image to the server computer;

the client computer receiving a second set of cells making up at least part of the image at a second resolution from the server computer; and the client computer directly displaying the second set of cells to the user.

2. The method of claim 1, further comprising:

the client computer sending a second instruction to pan the image to the server computer;

the client computer receiving a third set of cells making up at least part of the image at the second resolution from the server computer; and the client computer directly displaying the third set of cells to the user.

3. A method for displaying an image, wherein the image is stored in different resolutions in its entirety and the image at each resolution is divided into cells, the method comprising:

a client computer receiving a first set of cells making up a first part of the image at one of the resolutions from a server computer;

the client computer directly displaying the first set of cells to a user;

the client computer sending an instruction to pan the image to the server computer;

the client computer receiving a second set of cells making up another part of the image at said one resolution from the server computer; and the client computer directly displaying the second set of cells to the user.

* * * * *